US008055775B2

(12) United States Patent
Channabasavaiah et al.

(10) Patent No.: US 8,055,775 B2
(45) Date of Patent: Nov. 8, 2011

(54) SOA POLICY ENGINE FRAMEWORK

(75) Inventors: Kishore Channabasavaiah, Palatine, IL (US); Sri Ramanathan, Lutz, FL (US); Matthew B. Trevathan, Kennesaw, GA (US); Raghu Varadan, San Francisco, CA (US); Nevenko Zunic, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 240 days.

(21) Appl. No.: 12/410,592

(22) Filed: Mar. 25, 2009

(65) Prior Publication Data

US 2010/0251327 A1  Sep. 30, 2010

(51) Int. Cl.
G06F 15/173 (2006.01)
G06F 15/07 (2006.01)
(52) U.S. Cl. .................. 709/226; 709/225; 709/217
(58) Field of Classification Search .................. 709/217, 709/231, 226, 225
See application file for complete search history.

(56) References Cited

U.S. PATENT DOCUMENTS

| 6,944,183 B1 | 9/2005 | Iyer et al. | |
| 2004/0093381 A1* | 5/2004 | Hodges et al. | 709/204 |
| 2004/0103339 A1 | 5/2004 | Chalasani et al. | |
| 2004/0236760 A1* | 11/2004 | Arkeketa et al. | 707/100 |
| 2005/0216555 A1* | 9/2005 | English et al. | 709/204 |
| 2006/0036463 A1* | 2/2006 | Patrick et al. | 705/1 |
| 2006/0143686 A1* | 6/2006 | Maes | 726/1 |
| 2007/0011281 A1* | 1/2007 | Jhoney et al. | 709/220 |
| 2007/0033194 A1* | 2/2007 | Srinivas et al. | 707/10 |
| 2007/0069896 A1* | 3/2007 | Boland et al. | 340/572.1 |
| 2008/0114799 A1* | 5/2008 | Chasen | 707/101 |
| 2008/0127047 A1 | 5/2008 | Zhang et al. | |
| 2008/0178169 A1 | 7/2008 | Grossner et al. | |
| 2008/0244552 A1 | 10/2008 | Toeroe | |
| 2008/0285481 A1 | 11/2008 | Hao et al. | |

FOREIGN PATENT DOCUMENTS

WO 2008037788 3/2008

* cited by examiner

Primary Examiner — Karen Tang
(74) Attorney, Agent, or Firm — Patrick J. Daugherty; Driggs, Hogg, Daugherty & Del Zoppo Co., LPA

(57) ABSTRACT

Methods, including service methods, articles of manufacture, systems, articles and programmable devices provide a policy engine framework. A consumer policy request for a web service is mediated through a functional web service or a policy web service. A single unified method call is made to policy adapters in response to the mediated customer request, each of the policy adapters in communication with a policy server. The policy adapters transform the single unified method call into formats acceptable by each associated policy servers and place the transformed requests to the associated servers. Results from the policy servers are formatted by policy adapters and a policy is selected from a policy registry repository as a function of the formatted results and returned to a requesting consumer.

16 Claims, 3 Drawing Sheets

US 8,055,775 B2

SOA POLICY ENGINE FRAMEWORK

FIELD OF THE INVENTION

The present invention generally describes a policy engine framework within a service-oriented architecture.

BACKGROUND OF THE INVENTION

It is known for organizations to use service-oriented architecture (SOA) methods, systems and governance models to develop and deploy shareable and reusable services. However, problems arise as deploying multiple shareable and reusable services across an SOA enterprise generally requires web services and service buses to access multiple policies across many policy servers and multiple policy repositories. Business and technology teams are thus required to manage and work with different policy servers for effective communication, which generally requires developers to create interfaces for each different policy server. Prior art architecture solutions and structures may not effectively promote SOA services reuse, may be hard to govern, and may not be scalable.

SUMMARY OF THE INVENTION

Methods provide a policy engine framework. A consumer policy request for a web service is mediated through a functional web service or a policy web service. A single unified method call is made to policy adapters in response to the mediated customer request, each of the policy adapters in communication with a policy server. The policy adapters transform the single unified method call into formats acceptable by each associated policy servers and place the transformed requests to the associated servers. Results from the policy servers are formatted by policy adapters and a policy is selected from a policy registry repository as a function of the formatted results and returned to a requesting consumer.

Articles of manufacture comprising a computer usable medium having a computer readable program in said medium are also provided. Such program code comprises instructions which, when executed on a computer system, cause the computer system to perform one or more method and/or process elements described above for providing a policy engine framework.

Systems, articles and programmable devices are also provided, configured for performing one or more method and/or process elements of the current invention for providing a policy engine framework. In one example, a policy broker engine is provided in communication with a service registry and with policy servers through policy adapters. A policy registry repository is also in communication with the policy broker engine, and an enterprise service bus mediator in communication with the policy broker engine and the service registry. The policy broker engine is configured to formulate a single unified method call to the policy adapters in response to a consumer request through the mediator. The policy adapters are configured to transform the received single unified method call into a format acceptable by each associated policy server, place the transformed requests to the associated policy servers and format results from the policy servers back to the policy broker engine. The mediator is further configured to return a policy selected from the policy registry repository as a function of the formatted result to a requesting consumer.

Service methods are also provided comprising deploying programmable devices, logic components or applications for providing a policy engine framework according to the method steps described above, for example by a service provider who offers to implement, deploy, and/or perform functions for others.

BRIEF DESCRIPTION OF THE DRAWINGS

These and other features of the methods, systems and devices according to the present application will be more readily understood from the following detailed description of the various aspects of the embodiments taken in conjunction with the accompanying drawings in which.

Figure 1:
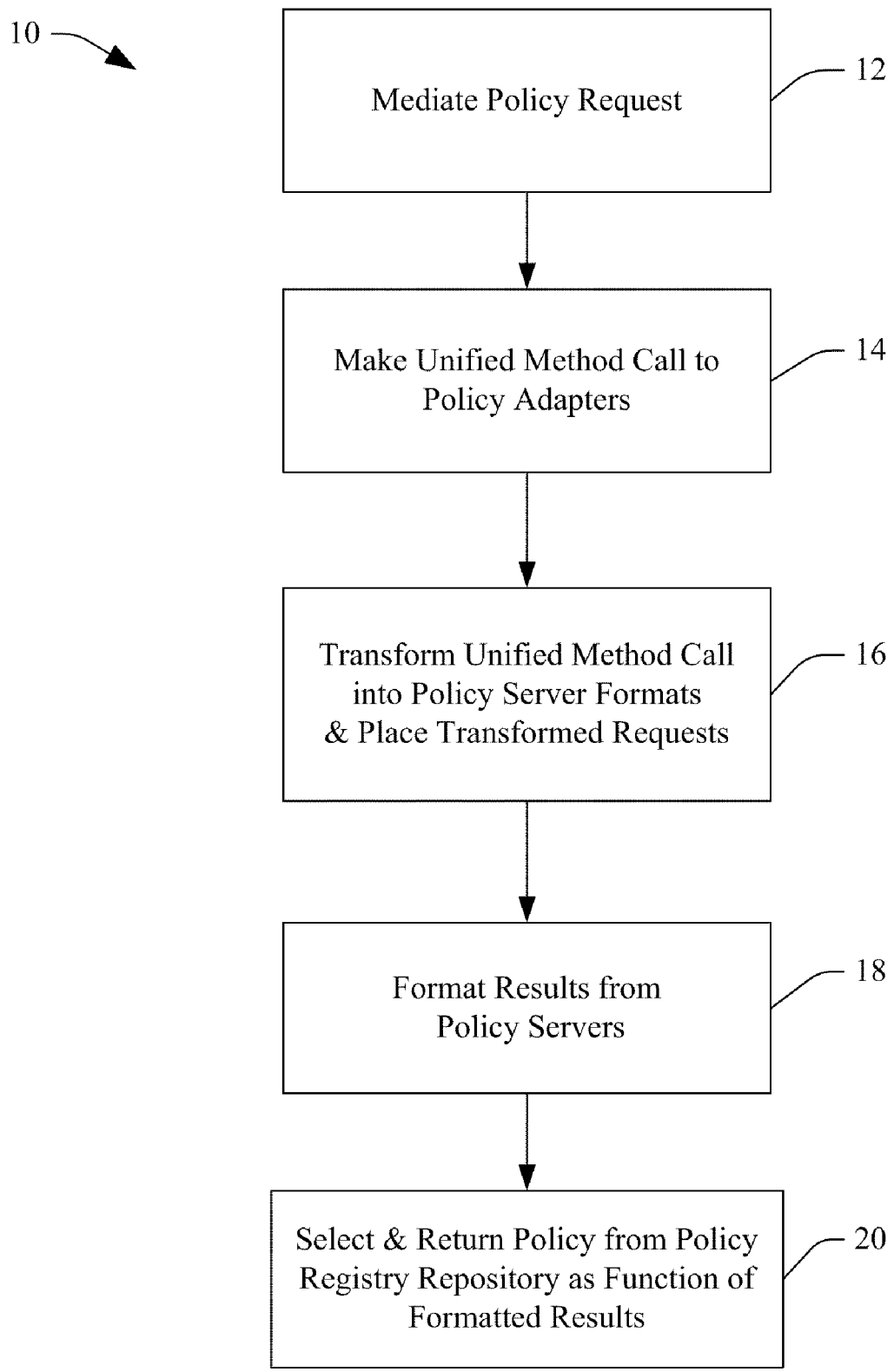
FIG. 1 is a block diagram illustration of a policy engine framework according to the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience the Detailed Description of the Invention has the following sections:
I. General Description; and
II. Computerized Implementation.

I. General Description

SOA governance may be understood to encompass an entire organization involved in a transformation and should require participation by multiple stakeholders in definition and realization. A well-defined governance framework and underlying model helps to drive effective change across an enterprise, and may be a key to success irrespective of an entry point chosen by an enterprise for an SOA transformation. Additionally, an effective SOA governance model may be realized by establishing a governance body comprising domain owners and stakeholders with delegated responsibility for decision making.

Problems may arise in prior art SOA governance structures through deploying multiple shareable and reusable services across an SOA enterprise when web services and Enterprise Service Buses (ESB's) are required to access multiple policies across many policy servers and multiple policy repositories. Requiring business and technology teams to manage and work with different policy servers for effective communication in prior art SOA structures generally entails requiring developers to create interfaces for each different policy server, which deters effective promotion of SOA services reuse, and may result in hard-to-govern and non-scalable SOA structures.

More particularly, a prior art SOA enterprise is hard to govern if services have to span multiple policy servers to formulate a call flow. If one of a plurality of policy servers is sunset or updated, this change may not be reflected to all the services that use the given policy server, which creates policy problems for a service, including causing the service to fail to function after a policy upgrade. A policy server may also be sun-setted without understanding the implications of sun-setting the policy server. Although the prior art offers general teachings on handling authentication and authorization through Lightweight Directory Access Protocol (LDAP) and persistent data storage means (for example a database), no compelling prior art method, system or framework provides effective management of communications across multiple policy servers.

FIG. 1 illustrates a method or process for providing a service-oriented architecture policy engine framework 10 according to the present invention. At 12 a consumer policy request for a web service is mediated through a functional web service and/or a policy web service. At 14 a single unified method call is made to each of a plurality of policy adapters in response to the mediated customer request, each of the plurality of policy adapters in communication with one each of a plurality of policy servers. At 16 each of the called policy adapters transforms the single unified method call into a format acceptable by an associated policy server and places the transformed request to the associated policy server. At 18 at least one of the called policy adapters formats a result back from an associated policy server, and at 20 a policy is returned from a policy registry repository to a requesting consumer as a function of the formatted result.

Figure 2:
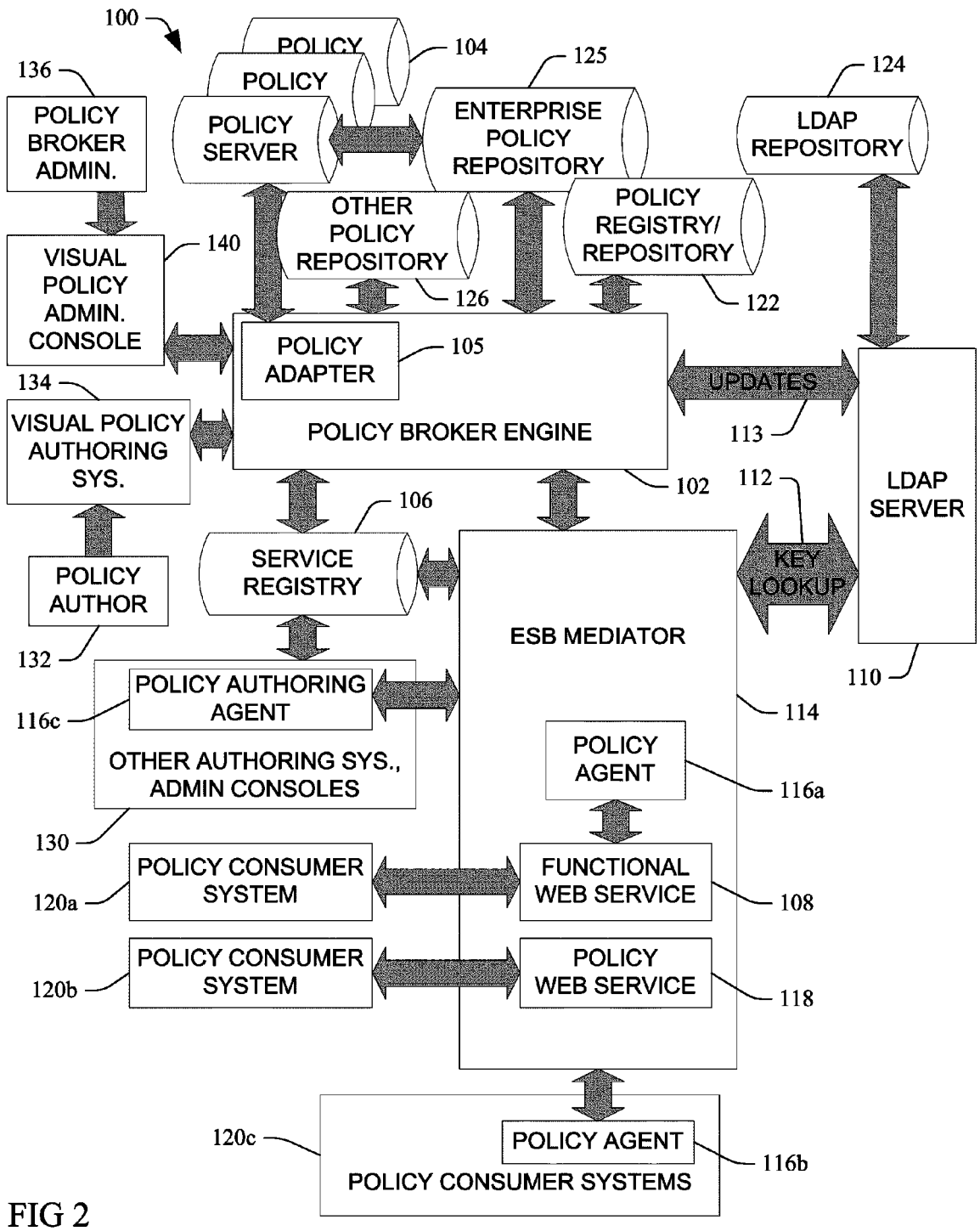
FIG. 2 illustrates a policy engine framework according to the present invention.

FIG. 2 illustrates a policy engine framework 100 according to the present invention. A policy broker engine 102 functions as a core component of the overall policy engine framework 100. Both design time and run-time aspects are represented in the overall framework 100. The realization of the framework 100 may be based on a variety of different approaches, and illustrative but not exhaustive examples include separate design time and run-time modules and a single comprehensive implementation of the policy broker engine 102, wherein design time modules may enable authoring, verification and validation of polices for any given scenario.

The policy broker engine 102 communicates with other relevant systems including existing policy servers 104 (in some embodiments through policy adapters 105) and service registries 106 to enable effective authoring of policies. At run-time policy consumers or systems 120 interact with the policy broker engine 102 for access to the relevant policies. An LDAP server 110 provides for improved throughput by storing policy reference keys in an associated LDAP repository 124 that increase the speed of policy lookups, providing access to key lookups 112 from an enterprise service bus (ESB) mediator 114 for policies generated at design time for each approved policy. In one aspect, lookup keys are leveraged for indexed access to policies at run-time. It will be appreciated by one skilled in the art that in some embodiments other lightweight mechanism means for authentication and authorization may be used in the place of the LDAP server 110, and the present invention is not limited to the embodiment illustrated in FIG. 1 and discussed herein.

The ESB mediator 114 acts on behalf of consumer/systems 120 to make requests to the policy broker engine 102. When the policy broker engine 102 returns a complex flow-based policy in the policy registry and repository 122 it is the responsibility of the ESB mediator 114 complete that flow. The ESB mediator 114 is also used to cache policies and register lookups to increase the speed at which policies and service lookups are returned.

ESB mediator 114 policy agents 116 and web services 118 are leveraged for access to the engine during both design time and run time. More particularly, the framework 100 comprises policy agents 116 interacting with the policy broker engine 102 and which may be distributed across the framework 100 eco-system, in one aspect providing for both a small foot-print and seamless access to all the capabilities of the policy framework 100 environment. Policy agents 116a within the ESB mediator 114 may help to mediate policy consumer system 120a requests for web services through a functional web service component 108 and policy consumer system 120b requests for web services through a policy web service component 118. Policy agents 116c within a policy consumer system 120c may also intercept requests for web services and route them to the policy broker engine 102 through the ESB mediator 114, wherein the ESB mediator 114 may return a whole result back to a consumer via the policy agent 116b; in one aspect this may occur when the ESB mediator 114 makes calls to composite services that may rely on policies that create different results depending on which policy is enforced.

The policy broker engine 102 acts as an interface to legacy policies servers 104, enterprise policy repositories 125, the policy registry repository 122 and other policy repositories 126, formulating calls to one policy service via a unified method (for example, through an extensible markup language (XML) call) while actually making multiple calls to different policy servers 104 on behalf of a consumer/system 120. Thus the present framework 100 provides users an interface to multiple policy servers (including an LDAP or database) by coding to a specification defined in the policy broker engine 102, allowing an enterprise to leverage all of its policy servers 104 via a unified interface.

Moreover, not only does the policy broker engine 102 handle authentication and authorization, it may also define workflows and business rules via the policy registry repository 122. The policy registry repository 122 acts as a rules engine for policies and services. One function of the policy registry repository 122 is to define rules and call flows for the policy broker engine 102 that the ESB mediator 114 may use during a service call: this means that a policy workflow may consist of multiple service calls that may very from user 120 to user 120 or group 120 to group 120.

In one aspect, policy information and service information stored in the policy registry repository 122 and the service registry(ies) 106 are synchronized. Thus, when a service is updated or deleted, the service registry 106 confirms that the policy is modified or a warning ascent is communicated to a requester for a delete; if a user continues with a delete process then the delete removes both the policy and the service from the policy registry repository 122 and from the service registry(ies) 106. The LDAP server 110 also receives data 113 with respect to the updates, revisions, etc., and uses said update data 113 to update look-up key data in the LDAP repository 124.

Even though a request for a policy may be made via a unified interface to the policy broker 102, each policy server 104 may require its own policy adapter 105 that transforms a policy request to the policy broker engine 102 into a format acceptable by the each policy server 104: thus it is the job of the policy adapter 105 to transform a request, place a request to the respective policy server 104 and format a result back to the policy broker engine 102.

A policy authoring agent 116c is also provided, in some embodiments within another authoring system or administration console 130. The policy authoring agent 116c is responsible for creating new policies, editing policies, and deleting policies from the framework 100. The ESB mediator 114 controls access to policies and services by acting as a central point for the policy authoring agent 116c to create policies. More particularly, a policy created via the policy authoring agent 116c can affect multiple components in the framework 100, illustratively including the service registry(ies) 106, communication with policy authors 132 through visual interactive policy authoring systems 134 and communication with policy broker administrators 136 through visual interactive policy administration consoles 140. A policy itself may be considered a business role that ties services together via their group or user permissions, and a policy authoring agent 116c according to the present invention is able to see what services are available via the services registry 106, what groups and users are available, and what actions may be performed that are already defined in the policy registry repository 122.

The policy engine framework 100 may be leveraged in organizations of all sizes, in one aspect because of the flexibility of the overall framework 100 environment. The framework 100 can be implemented as a comprehensive runtime solution or as a module of a larger application server environment. In addition, policy design tooling through the framework 100 may be implemented either as stand-alone solution or part of a comprehensive tooling portfolio. Run-time management and administrative components may also be implemented as part of both business and technology dashboards/consoles (for example, as part of a visual interactive policy administration console 140), or as unique instances meeting specific audience requirements. Moreover, the framework 100 may also be adapted to other, different solution environments in addition to SOA, and may be integrated as part of a comprehensive ecosystem as one component of an overall solution addressing requirements of policy management.

The present invention provides an approach to identify and communicate with the right policy server 104, allowing end-users to communicate with multiple policy servers 104 within the scope of a request without having to communicate with every server 104 separately. In addition this also eliminates the requirement to understand how many such policy servers 104 are within the scope of an enterprise, as this data accumulates in the framework 100 components. Thus, a developer may communicate with multiple policy servers 104 within a call flow without needing to create a custom interface for each policy server 104 that is to be leveraged.

In another aspect, the present invention provides for the de-coupling of a service requestor, service provider and the rest of the infrastructure by abstracting service meta-data through the service registry 106. Extended flexibility is also provided by allowing the ESB mediator 114 or any other service integration infrastructure component to perform core routing and mediating functionality with the help of service metadata and corresponding policy information. The speed of request processing is also increased by the use of the policy broker engine 102 via policy key lookup methodology in the LDAP 110 infrastructure.

In another aspect, the framework 100 provides a mechanism for creating policy-based call flows. A policy broker administrator 136 may query the policy broker engine 102 through a visual interactive policy administration console 140 to determine what call flows and services are using a policy server 104. This centralized view provides the administrator 136 with an on-going snap-shot of usage patterns and interactions, in one aspect similar to providing a call detail record of a telecom infrastructure, enabling effective management of the policy environment. By providing a central mechanism framework 100 for authoring new policies that span multiple policy servers the present invention also eliminates redundancies and duplication. Additionally, the present invention provides a uniform way of requesting policies from other policy servers 104 by creating a standard interface for communicating to the policy broker engine 102 and transforming calls from the policy broker engine 102 into a proper format of an external policy server 104.

Figure 3:
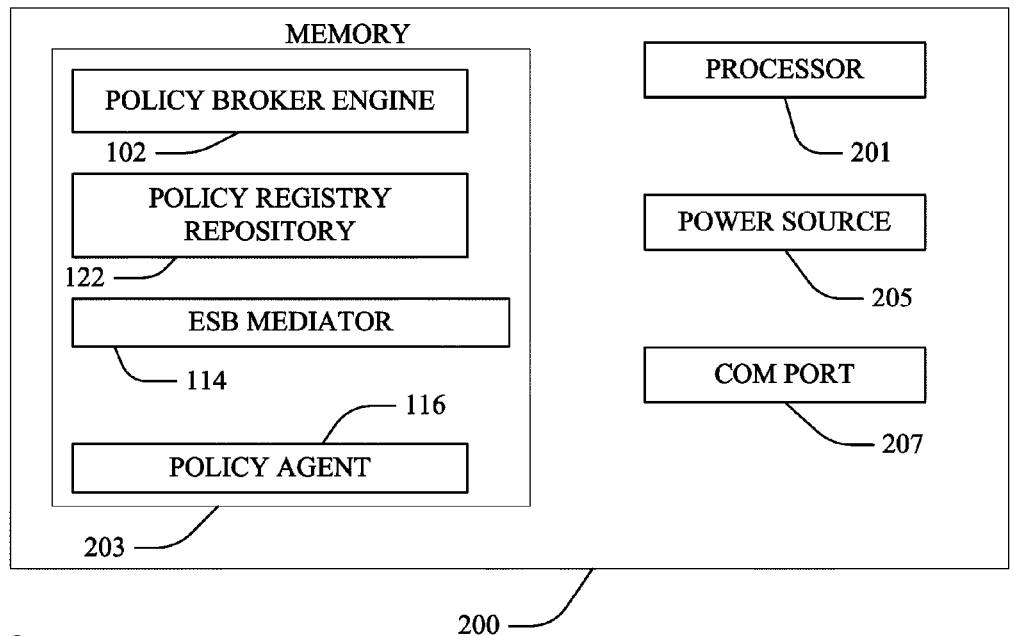
FIG. 3 is a block diagram of a system or device configured to provide a policy engine framework according to the present invention.

FIG. 3 illustrates a programmable device or module 200 configured to provide a policy engine framework according to the present invention, for example as illustrated in FIGS. 1 and 2 and described above. The device 200 may be incorporated into a larger system (such as one provided by a service provider) wherein other applications and components of the larger system accomplish systems and methods according to the present invention, or it may be a stand-alone device or module 200 configured to perform each of the systems and methods described above. The present embodiment thus comprises a central processing unit (CPU) or other processing means 201 in communication with a memory 203 comprising logic components that enable the CPU 201 to perform processes and methods according to the present application, as will be understood through reference to FIGS. 1 and 2 as discussed above. Thus, the memory 203 comprises a policy broker engine 102 logic component configured to communicate with other policy servers through policy adapters and service registries to enable effective authoring of policies; a policy registry repository 122 logic component configured to act as a rules engine for policies and services; an ESB mediator 114 logic component configured to act on behalf of consumer/systems to make requests to the policy broker engine 102; and a policy agent 116 logic component configured to interact with the policy broker engine 102.

A power source 205 is configured to provide operative power to the device 200; examples include battery units 205 and power inputs configured to receive alternating or direct current electrical power, and other appropriate power units 205 will be apparent to one skilled in the art. A communication port or network link/node means ("com port") 207 is also provided and configured to enable data and other communications as may be appropriate, for example as discussed above.

II. Computerized Implementation

Figure 4:
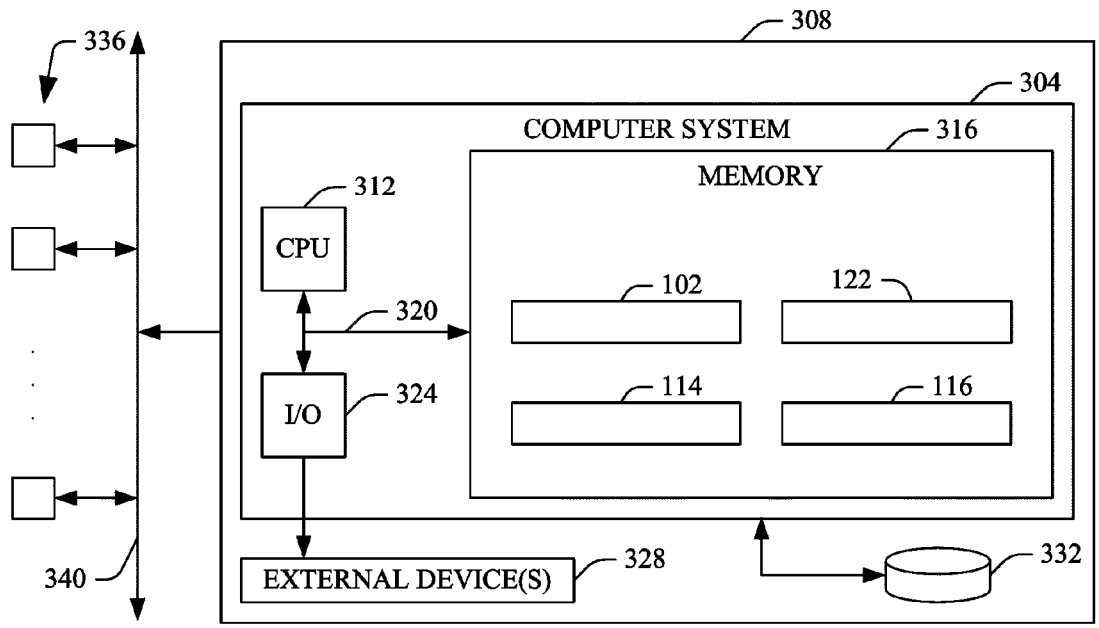
FIG. 4 is a block diagram illustrating a computerized implementation of a policy engine framework according to the present invention.

Referring now to FIG. 4, an exemplary computerized implementation of a business services portfolio-centric SOA governance framework according to the present invention includes a computer system 304 deployed within a computer infrastructure 308 such as a computer or a programmable device such as a personal digital assistant (PDA) or cellular phone. This is intended to demonstrate, among other things, that the present invention could be implemented within a network environment 340 (e.g., the Internet, a wide area network (WAN), a local area network (LAN), a virtual private network (VPN), etc.) in communication with one or more additional computers 336, or on a stand-alone computer infrastructure 308. In the case of the former, communication throughout the network 340 can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet.

As shown, the computer system 304 includes a central processing unit (CPU) 312, a memory 316, a bus 320, and input/output (I/O) interfaces 324. Further, the computer system 304 is shown in communication with external I/O devices/resources 328 and storage systems 332. In general, the processing unit 312 executes computer program code, such as the code to implement various components of the process and systems, and devices as illustrated in FIGS. 1 through 3 and described above, including the policy broker engine 102 logic component, the policy registry repository 122 logic component, the ESB mediator 114 logic component and the policy agent 116 logic component, and which are stored in memory 316 and/or storage system 332. It is to be appreciated that two or more, including all, of these components may be implemented as a single component.

While executing computer program code, the processing unit 312 can read and/or write data to/from the memory 316, the storage system 332 (e.g. the, and/or the I/O interfaces 324. The bus 320 provides a communication link between each of the components in computer system 304. The external devices 328 can comprise any devices (e.g., keyboards, pointing devices, displays, etc.) that enable a user to interact with computer system 304 and/or any devices (e.g., network card, modem, etc.) that enable computer system 304 to communicate with one or more other computing devices.

The computer infrastructure 308 is only illustrative of various types of computer infrastructures for implementing the invention. For example, in one embodiment, computer infrastructure 308 comprises two or more computing devices (e.g., a server cluster) that communicate over a network to perform the various process steps of the invention. Moreover, computer system 304 is only representative of various possible computer systems that can include numerous combinations of hardware.

To this extent, in other embodiments, the computer system 304 can comprise any specific purpose-computing article of manufacture comprising hardware and/or computer program code for performing specific functions, any computing article of manufacture that comprises a combination of specific purpose and general-purpose hardware/software, or the like. In each case, the program code and hardware can be created using standard programming and engineering techniques, respectively. Moreover, the processing unit 312 may comprise a single processing unit, or be distributed across one or more processing units in one or more locations, e.g., on a client and server. Similarly, the memory 316 and/or the storage system 332 can comprise any combination of various types of data storage and/or transmission media that reside at one or more physical locations.

Further, I/O interfaces 324 can comprise any system for exchanging information with one or more of the external device 328. Still further, it is understood that one or more additional components (e.g., system software, math co-processing unit, etc.) not shown in FIG. 4 can be included in computer system 304. However, if computer system 304 comprises a handheld device or the like, it is understood that one or more of the external devices 328 (e.g., a display) and/or the storage system 332 could be contained within computer system 304, not externally as shown.

The storage system 332 can be any type of system (e.g., a database) capable of providing storage for information under the present invention. To this extent, the storage system 332 could include one or more storage devices, such as a magnetic disk drive or an optical disk drive. In another embodiment, the storage system 332 includes data distributed across, for example, a local area network (LAN), wide area network (WAN) or a storage area network (SAN) (not shown). In addition, although not shown, additional components, such as cache memory, communication systems, system software, etc., may be incorporated into computer system 304.

While shown and described herein as a method and a system, it is understood that the invention further provides various alternative embodiments. For example, in one embodiment, the invention provides a computer-readable/useable medium that includes computer program code to enable a computer infrastructure to implement methods, systems and devices according to the present application, for example as illustrated in FIGS. 1 through 4 described above and otherwise herein. To this extent, the computer-readable/useable medium includes program code that implements each of the various process steps of the present application.

It is understood that the terms computer-readable medium or computer useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as the memory 316 and/or the storage system 332 (e.g., a fixed disk, a read-only memory, a random access memory, a cache memory, etc.), and/or as a data signal (e.g., a propagated signal) traveling over a network (e.g., during a wired/wireless electronic distribution of the program code).

Still yet, computer infrastructure 308 is intended to demonstrate that some or all of the components of implementation according to the present application could be deployed, managed, serviced, etc. by a service provider who offers to implement, deploy, and/or perform the functions of the present invention for others, for example by licensing methods and browser or application server technology to an internet service provider (ISP) or a cellular telephone provider. In one embodiment, the invention may comprise a business method that performs the process steps of the invention on a subscription, advertising, and/or fee basis. Thus, a service provider can create, maintain, support, etc., a computer infrastructure, such as the computer infrastructure 308 that performs the process steps of the present application for one or more customers, and in return the service provider can receive payment from the customer(s) under a subscription and/or fee agreement and/or the service provider can receive payment from the sale of advertising content to one or more third parties.

In still another embodiment, the invention provides a computer-implemented method for enabling the processes, methods and devices according to the present application. In this case, a computer infrastructure, such as computer infrastructure 308, can be provided and one or more systems for performing the process steps of the invention can be obtained (e.g., created, purchased, used, modified, etc.) and deployed to the computer infrastructure. To this extent, the deployment of a system can comprise one or more of: (1) installing program code on a computing device, such as computer system 304, from a computer-readable medium; (2) adding one or more computing devices to the computer infrastructure; and (3) incorporating and/or modifying one or more existing systems of the computer infrastructure to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

Computer readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Certain examples and elements described in the present specification, including in the claims and as illustrated in the Figures, may be distinguished or otherwise identified from others by unique adjectives (e.g. a "first" element distinguished from another "second" or "third" of a plurality of elements, a "primary" distinguished from a "secondary," one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method for providing a policy engine framework, comprising:
    mediating a consumer policy request for a web service through at least one of a functional web service and a policy web service;
    making a single unified method call to each of a plurality of policy adapters in response to the mediated customer request, each of the plurality of policy adapters in communication with one each of a plurality of different policy servers;
    each of the called policy adapters performing a run-time key look-up via an enterprise service bus mediator of policy reference keys stored in a lightweight data access protocol server repository for an approved policy generated at design time for an associated policy server, transforming the single unified method call into a format acceptable by the approved policy of the associated policy server, and placing the transformed request to the associated policy server;
    any at least one of the called policy adapters formatting a result back from an associated one of the associated policy servers;
    selecting a complex flow-based policy from a policy registry repository as a function of the formatted result;
    completing the selected complex flow-based policy by defining a workflow and a business rule that the enterprise service bus mediator may use during a service call as a function of data in the policy registry repository; and
    returning the completed selected complex flow-based policy to a requesting consumer.

2. The method of claim 1, further comprising:
    mediating the consumer request through at least one of a functional web service and a policy web service.

3. The method of claim 2, further comprising:
    making a plurality of calls to a plurality of composite services, wherein the composite services create a plurality of different results as a function of an enforcement policy.

4. The method of claim 2, wherein the unified method call is an extensible markup language call.

5. The method of claim 2, further comprising:
    synchronizing the complex flow-based policy within the policy registry repository to a service stored within a service registry;
    confirming that the complex flow-based policy is modified or communicating a warning ascent in response to a modification of the synchronized service stored within the service registry; and
    if a warned user continues with a delete process, removing the complex flow-based policy from the policy registry repository and removing the synchronized service from the service registry.

6. A method for providing a policy engine framework, comprising:
    providing computer executable program code stored on a computer readable storage device to be deployed and executed on a computer system, the program code comprising instructions which, when executed on the computer system, cause the computer system to:
    make a single unified method call to each of a plurality of policy adapters in response to a mediated customer request, each of the plurality of policy adapters associated with one each of a plurality of different policy servers in response to a customer request;
    perform a run-time key look-up via the called policy adapters of policy reference keys stored in a lightweight data access protocol server repository for approved policies generated at design time for their associated policy servers;
    transform the single unified method call into each of a plurality of formats, each of the plurality of formats acceptable by a one of the approved policies generated at design time of an associated one of the policy servers, and place the transformed request to each of the servers in the formats acceptable to the placed servers;
    format a result back from any at least one of the policy servers;
    select a complex flow-based policy from a policy registry repository as a function of the formatted result;
    complete the selected complex flow-based policy by defining a workflow and a business rule that the enterprise service bus mediator may use during a service call as a function of data in the policy registry repository; and
    return the completed selected complex flow-based policy to a requesting consumer.

7. The method of claim 6, the program code comprising instructions which, when executed on the computer system, causes the computer system to mediate the consumer request through at least one of a functional web service and a policy web service.

8. The method of claim 7, the program code comprising instructions which, when executed on the computer system, causes the computer system to make the unified method call in an extensible markup language call.

9. The method of claim 8, the program code comprising instructions which, when executed on the computer system, causes the computer system to:
synchronize the complex flow-based policy within the policy registry repository to a service stored within a service registry;
confirm that the complex flow-based policy is modified or communicate a warning ascent in response to a modification of the synchronized service stored within the service registry; and
if a warned user continues with a delete process, remove the complex flow-based policy from the policy registry repository and remove the synchronized service from the service registry.

10. A policy engine framework, comprising:
a policy broker engine in communication with a plurality of different policy servers through each of a plurality of policy adapters, the policy broker further in communication with a service registry;
a policy registry repository in communication with the policy broker engine; and
an enterprise service bus mediator in communication with the policy broker engine and the service registry;
wherein the policy broker engine, in response to a consumer request through the enterprise service bus mediator, formulates a single unified method call to each of the policy adapters;
wherein each of the called policy adapters:
perform a run-time key look-up via an enterprise service bus mediator of policy reference keys stored in a lightweight data access protocol server repository for an approved policy generated at design time for an associated policy server;
transform the single unified method call into a format acceptable by the approved policy of an associated one of the policy servers;
place the transformed request to the associated policy server; and
format a result from any at least one of the associated policy servers back to the policy broker engine; and wherein the enterprise service bus mediator:
selects a complex flow-based policy from the policy registry repository as a function of the formatted result;
completes the selected complex flow-based policy by defining a workflow and a business rule for use during a service call as a function of data in the policy registry repository; and
returns the completed selected complex flow-based policy to a requesting consumer.

11. The framework of claim 10, further comprising:
a policy agent in communication with the policy broker engine, the mediator and with a web service;
wherein the policy agent is configured to mediate the consumer request through at least one of a functional web service and a policy web service.

12. The framework of claim 11, wherein the policy agent is a plurality of policy agents distributed within each of the mediator, a policy consumer system, and an authoring console.

13. The framework of claim 10 wherein at least one of the policy broker engine, the policy registry repository, the enterprise service bus mediator and the plurality of policy adapters is deployed by a service provider.

14. The framework of claim 13, further comprising:
a policy agent deployed by the service provider and in communication with the policy broker engine, the mediator and with a web service;
wherein the policy agent is configured to mediate the consumer request through at least one of a functional web service and a policy web service.

15. The framework of claim 14, wherein the policy agent is a plurality of policy agents distributed by the service provider within each of the mediator, a policy consumer system, and an authoring console.

16. The framework of claim 15 wherein the policy broker engine further:
synchronizes the complex flow-based policy within the policy registry repository to a service stored within a service registry;
confirms that the complex flow-based policy is modified or communicates a warning ascent in response to a modification of the synchronized service stored within the service registry; and
if a warned user continues with a delete process, removes the complex flow-based policy from the policy registry repository and removes the synchronized service from the service registry.

* * * * *